(12) United States Patent
Lee et al.

(10) Patent No.: US 8,804,510 B2
(45) Date of Patent: Aug. 12, 2014

(54) SYSTEM AND METHOD FOR MANAGING RESOURCE IN COMMUNICATION SYSTEM

(75) Inventors: Dong-Hun Lee, Daejeon (KR); Hyunduk Kang, Gwangju (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 104 days.

(21) Appl. No.: 13/339,739

(22) Filed: Dec. 29, 2011

(65) Prior Publication Data

US 2012/0201209 A1 Aug. 9, 2012

(30) Foreign Application Priority Data

Dec. 29, 2010 (KR) .......... 10-2010-0137984
Jun. 16, 2011 (KR) .......... 10-2011-0058732
Dec. 28, 2011 (KR) .......... 10-2011-0144404

(51) Int. Cl.
*H04L 12/28* (2006.01)
*H04W 4/00* (2009.01)
*H04J 3/16* (2006.01)
*G06F 15/173* (2006.01)

(52) U.S. Cl.
USPC ........ 370/230; 370/329; 370/395.2; 370/437; 709/226

(58) Field of Classification Search
USPC .......... 709/208–211, 223–244; 370/310–350, 370/431–485
See application file for complete search history.

(56) References Cited

U.S. PATENT DOCUMENTS

| | | | |
|---|---|---|---|
| 7,869,400 B2 | 1/2011 | Hu et al. | |
| 8,200,161 B2 | 6/2012 | Walley et al. | |
| 8,289,903 B2 * | 10/2012 | Shan et al. | 370/328 |
| 8,310,991 B2 | 11/2012 | Kasslin et al. | |
| 8,363,602 B2 | 1/2013 | Junell et al. | |
| 8,379,586 B2 | 2/2013 | Kasslin et al. | |
| 8,385,286 B2 * | 2/2013 | Junell et al. | 370/329 |

(Continued)

FOREIGN PATENT DOCUMENTS

| | | |
|---|---|---|
| EP | 2 083 593 A2 | 7/2009 |
| KR | 1020060060452 A | 6/2006 |

(Continued)

OTHER PUBLICATIONS

Jihyun Lee, et al; "Coexistence Procedures and Protocols", IEEE 802.19 Wireless Coexistence Working Group IEEE P802.19-11/0009r1; Jan. 17, 2011, 87 pages.

(Continued)

*Primary Examiner* — Tri H Phan
(74) *Attorney, Agent, or Firm* — Ladas & Parry LLP

(57) ABSTRACT

A system for managing resources in a communication system including systems which do not have a permission for a first frequency band includes a coexistence manager configured to, when a frequency band available for the systems is searched from the first frequency band, manage the systems for coexistence and frequency sharing of the systems in the available frequency band; a coexistence enabler configured to transmit and receive information of the systems and information of the coexistence manager; and a coexistence discovery and information server configured to support control of the coexistence manager over the systems, wherein a plurality of coexistence managers are provided to respectively correspond to the plurality of systems, and wherein, among the plurality of coexistence managers, a first coexistence manager performs a negotiation procedure with coexistence managers neighboring to it, on the basis of one of an etiquette mode, a round-robin mode and a competition mode.

20 Claims, 5 Drawing Sheets

(56) References Cited

U.S. PATENT DOCUMENTS

| | | |
|---|---|---|
| 8,451,789 B2 | 5/2013 | Junell et al. |
| 8,514,802 B2 | 8/2013 | Junell |
| 8,615,250 B2 | 12/2013 | Xing |
| 2007/0223508 A1 | 9/2007 | Nandagopalan |
| 2008/0108366 A1 | 5/2008 | Hu |
| 2009/0059856 A1 | 3/2009 | Kermoal et al. |
| 2010/0061326 A1 | 3/2010 | Lee et al. |
| 2010/0124254 A1 | 5/2010 | Wu et al. |
| 2011/0032892 A1 | 2/2011 | Bahl et al. |
| 2011/0075586 A1 | 3/2011 | Hu et al. |
| 2011/0096770 A1 | 4/2011 | Henry |
| 2011/0116484 A1 | 5/2011 | Henry |
| 2011/0164580 A1 | 7/2011 | Keon |
| 2011/0164581 A1 | 7/2011 | Keon |
| 2011/0250858 A1 | 10/2011 | Jain et al. |
| 2011/0286401 A1 | 11/2011 | Wijting et al. |
| 2011/0287802 A1* | 11/2011 | Ma et al. ................ 455/517 |
| 2012/0058790 A1 | 3/2012 | Junell et al. |
| 2012/0106364 A1 | 5/2012 | Kasslin et al. |
| 2012/0108179 A1* | 5/2012 | Kasslin et al. ........... 455/67.13 |
| 2012/0113906 A1 | 5/2012 | Kadous et al. |
| 2012/0115525 A1 | 5/2012 | Kang et al. |
| 2012/0117243 A1* | 5/2012 | Lee et al. ................ 709/226 |
| 2012/0195269 A1* | 8/2012 | Kang et al. ............... 370/329 |
| 2012/0195270 A1* | 8/2012 | Kang et al. ............... 370/329 |
| 2012/0201208 A1* | 8/2012 | Kang et al. ............... 370/329 |
| 2012/0314681 A1* | 12/2012 | Chen et al. .............. 370/329 |
| 2013/0051279 A1* | 2/2013 | Lee et al. ................ 370/254 |
| 2013/0155995 A1* | 6/2013 | Jo et al. .................. 370/329 |
| 2013/0155998 A1 | 6/2013 | Jo et al. |
| 2013/0157681 A1 | 6/2013 | Jo et al. |
| 2013/0157706 A1 | 6/2013 | Jo et al. |
| 2013/0165136 A1* | 6/2013 | Kang et al. ............... 455/454 |
| 2013/0165170 A1* | 6/2013 | Kang ...................... 455/509 |

FOREIGN PATENT DOCUMENTS

| | | |
|---|---|---|
| KR | 1020070048171 A | 5/2007 |
| KR | 1020100053643 A | 5/2010 |
| KR | 1020110089262 A | 8/2011 |

OTHER PUBLICATIONS

Junyi Wang, et al; "Proposal for Chapter 6", IEEE 802.19 Wireless Coexistence Working Group IEEE 802.19-11/71r1; Jul. 18, 2011; 51 pages.

USPTO NOA mailed Jan. 10, 2014 in connection with U.S. Appl. No. 13/339,727.

* cited by examiner

SYSTEM AND METHOD FOR MANAGING RESOURCE IN COMMUNICATION SYSTEM

CROSS-REFERENCES TO RELATED APPLICATIONS

The present application claims priority of Korean Patent Application Nos. 10-2010-0137984, 10-2011-0058732, and 10-2011-0144404, filed on Dec. 29, 2010, Jun. 16, 2011, and Dec. 28, 2011, respectively, which are incorporated herein by reference in their entirety.

BACKGROUND OF THE INVENTION

1. Field of the Invention

Exemplary embodiments of the present invention relate to a communication system, and more particularly, to a system and a method for managing resources in a communication system so as to share a plurality of frequency resources in the communication system.

2. Description of Related Art

In a current communication system, research for providing services of various qualities of service (hereinafter, referred to as 'QoSs') to users at a high transmission rate has been actively conducted. In such a communication system, research for providing large-capacity services having various QoSs using limited resources, for example, frequency resources, has been actively conducted. In particular, due to development of radio communication technologies and introduction of new wireless communication services, there is a need to efficiently use limited frequency resources.

As a method for increasing efficiency of using limited frequency resources in a communication system, there have been suggested methods for optimizing performance of the communication system, for example, methods for minimizing interference with other types of communication systems while maximizing spectral efficiency by using multiple access, encoding, modulation, information compression, etc. Also, there has been suggested a frequency sharing method for increasing frequency resource utilization efficiency by using a frequency band available from an already used frequency band such as a TV band.

Here, the frequency sharing of the frequency band available from the already used frequency band such as a TV band needs to use the available frequency band without providing interference to a primary incumbent having a preemptive permission for the TV band. Therefore, it is important to detect the available frequency band by confirming whether or not the primary incumbent uses the available frequency band in the TV band. Further, in the case where a plurality of different systems intending to use the available frequency band detected in the TV band exist, a problem is caused in terms of coexistence for using the available frequency band due to a difference in communication pattern, for example, in wireless access pattern, among the plurality of different systems.

In other words, in the current communication system, in the case where the plurality of different systems intending to use the available frequency band detected in the TV band exist as described above, a detailed method for managing resources for allowing the plurality of different systems to efficiently use the detected available frequency band is not provided. In particular, a method for efficiently using frequency resources through coexistence of the systems adopting different communication patterns so as to use the available frequency band is not provided.

Therefore, a need exists for a method for managing resources for efficiently using the detected available frequency band through coexistence of the plurality of different systems, for example, the different communication patterns of systems, after detecting the available frequency band from the already used frequency band such as a TV band in the communication system.

SUMMARY OF THE INVENTION

An embodiment of the present invention is directed to a system and a method for managing resources in a communication system.

Another embodiment of the present invention is directed to a system and a method for managing resources so as to efficiently use frequency bands among frequency bands used in advance in a communication system by coexistence of a plurality of systems.

Another embodiment of the present invention is directed to a system and a method for managing frequency resources so as to use available frequency bands in a TV band by coexistence of a plurality of systems in a communication system.

Another embodiment of the present invention is directed to a system and a method for managing frequency resources so as to use available frequency bands of a TV band by efficient coexistence and frequency sharing of a plurality of systems in the available frequency bands in a communication system.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a system for managing resources in a communication system including a plurality of systems which do not have a permission for a first frequency band includes: a coexistence manager configured to, when a frequency band available for the plurality of systems is searched from the first frequency band, manage the plurality of systems for coexistence and frequency sharing of the plurality of systems in the available frequency band; a coexistence enabler configured to transmit and receive information of the plurality of systems and information of the coexistence manager; and a coexistence discovery and information server configured to support control of the coexistence manager over the plurality of systems, wherein a plurality of coexistence managers are provided to respectively correspond to the plurality of systems, and wherein, among the plurality of coexistence managers, a first coexistence manager performs a negotiation procedure with coexistence managers neighboring to it, on the basis of one of an etiquette mode, a round-robin mode and a competition mode.

In accordance with another embodiment of the present invention, a method for managing resources of a first frequency band in a communication system including a plurality of systems which do not have a permission for the first frequency band includes: transmitting a first negotiation request message by a first coexistence manager to coexistence managers neighboring to the first coexistence managers among a plurality of coexistence managers for managing the plurality of systems, when a frequency band available for the plurality of systems is searched from the first frequency band, for coexistence and frequency sharing of the plurality of systems in the available frequency band; receiving by the first coexistence manager, as a response to the first negotiation request message, a second negotiation request message from the neighbor coexistence managers; and through repeatedly transmitting and receiving the first and second negotiation request messages, performing by the first coexistence manager a negotiation procedure with the neighbor coexistence managers on the basis of one of an etiquette mode, a round-robin mode and a competition mode.

DESCRIPTION OF SPECIFIC EMBODIMENTS

Figure 1:
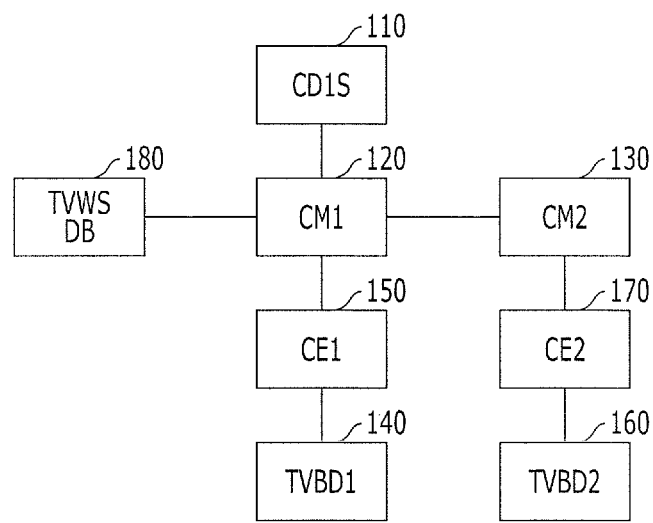
FIG. 1 is a diagram schematically showing a structure of a system for managing resources in a communication system in accordance with an exemplary embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

An Embodiment of the present invention proposes a system and a method for managing resources, capable of detecting an available frequency band, for example, an idle frequency band (a white space: hereinafter, referred to as a 'WS'), from an already used frequency band such as a TV band in a communication system, for example, a cognitive radio (hereinafter, referred to as 'CR') system, an IEEE 802.19-based system or an IEEE 802.22-based system, and of effectively using the detected available frequency band. Here, while the embodiment of the present invention is described by exemplifying the CR system and the IEEE 802.19-based and IEEE 802.22-based systems, it is to be noted that the method for managing resources proposed in the embodiment of the present invention may be applied to other communication systems.

Also, the embodiment of the present invention proposes a system and a method for managing resources so as to use a frequency band available from a TV band through coexistence of a plurality of different systems in a communication system. Here, the embodiment of the present invention provides coexistence of respective objects of the system for managing resources for providing the sharing of the available frequency band in the communication system and provides coexistence of a plurality of different systems, in particular, systems using different communication patterns, for example, different wireless access patterns, so as to share the available frequency band available from the already used frequency band such as a TV band, thereby improving frequency resource utilization efficiency.

That is, the embodiment of the present invention allows the system for managing resources for the coexistence and the frequency sharing among the plurality of different systems in the communication system to share the available frequency band, thereby improving the efficiency of using limited frequency resources. Here, the embodiment of the present invention shares a frequency in the available frequency band from the already used frequency band such as a TV band. In this regard, the embodiment of the present invention need to use the available frequency band without providing interference to a primary incumbent having a preemptive permission for the TV band. To this end, the embodiment of the present invention detects the available frequency band by confirming whether the primary incumbent uses the frequency band in the TV band, and selects and uses operating channels in the detected available frequency band through the coexistence and the frequency sharing of the plurality of difference systems intending to use the available frequency band detected from the TV band. In other words, in the embodiment of the present invention, the system for managing resources for the coexistence and the frequency sharing among the plurality of different systems in the communication systems allows predetermined objects to select the operating channels in the WS for efficient coexistence. In this case, the embodiment of the present invention classifies channels available in the WS for effective selection of the operating channels in the WS and allocates the classified channels.

Here, in order for efficient coexistence and frequency sharing among the plurality of different systems in the band available from the TV band, that is, in a TVWS, the system for managing resources performs message transmission and reception procedures. In other words, in order for efficient coexistence and frequency sharing of the plurality of different systems which use the TVWS, the system for managing resources transmits and receives messages among the respective objects of the system for managing resources. In particular, the system for managing resources transmits and receives messages regarding registration, coexistence information gathering, coexistence decision making, reconfiguration, management and an event, thereby improving efficiencies of the coexistence and frequency sharing of the plurality of different systems in the TVWS.

That is to say, in order for the efficient coexistence and frequency sharing of the plurality of different systems in the TVWS, in the system for managing resources according to the embodiment of the present invention, a registration procedure and a message in the registration procedure are defined, and a coexistence information gathering procedure and a message in the coexistence information gathering procedure are defined. Further, in the system for managing resources, a coexistence decision making procedure and a message in the coexistence decision making procedure are defined, a reconfiguration procedure and a message in the reconfiguration procedure are defined, a management procedure and a message in the management procedure are defined, and an event procedure and a message in the event procedure are defined. Namely, in order for the efficient coexistence and frequency sharing of the plurality of different systems in the TVWS, the messages defined in this way are transmitted and received among the respective objects of the system for managing resources, and the defined procedures are performed, thereby improving the efficiencies of the coexistence and frequency sharing of the plurality of different systems in the TVWS. Here, the system for managing resources in a communication system in accordance with the embodiments of the present invention will be described in more detail with reference to FIG. 1.

FIG. 1 is a diagram schematically illustrating a structure of a system for managing resources in a communication system in accordance with an embodiment of the present invention.

Referring to FIG. 1, when a plurality of different systems intend to use a frequency band available from an already used frequency band such as a TV band, that is, a TVWS, the system for managing resources includes sharing devices intending to use the available frequency band through frequency sharing among the plurality of different systems, for example, a TV band device 1 (hereinafter, referred to as 'TVBD1') 140 and a TVBD2 160, coexistence managers (hereinafter, referred to as 'CMs') managing the TVBDs 140 and 160 for improving frequency sharing efficiency between the TVBDs 140 and 160, for example, a CM1 120 and a CM2 130, coexistence enablers (hereinafter, referred to as 'CEs') included in the TVBDs 140 and 160 or independently located to serve as passages between the TVBDs 140 and 160 and the CMs 120 and 130, for example, a CE1 150 and a CE2 170, a server supporting control of the TVBDs 140 and 160 by the CMs 120 and 130, for example, a coexistence discovery and information server (hereinafter, referred to as 'CDIS'), and a TVWS data base 180 (hereinafter, referred to as 'TVWS DB') providing channel information for the band available from the TV band, that is, the TVWS. Here, the system for managing resources includes the CEs, the CMs, the CDIS and the TVWS DB as objects for coexistence and frequency sharing of the plurality of systems, that is, the TVBDs, in the TVWS.

The TVBDs 140 and 160 mean devices of the plurality of different systems, that is, secondary systems, allowing other users (hereinafter, referred to as the 'secondary systems') who do not have a preemptive permission for the TV band, to detect and use a predetermined frequency band as the available frequency band from the TV band, when a primary incumbent (hereinafter, referred to as a 'primary system') having the preemptive permission for the TV band does not use the predetermined frequency band in the TV band as aforementioned above. Here, the TVBDs 140 and 160 share and use the predetermined frequency band through the coexistence and the frequency sharing so as to efficiently use limited frequency resources. That is, the TVBDs 140 and 160 are allocated with channels from the TVWS, and transmit and receive data.

The CEs 150 and 170 are independently located in the TVBDs 140 and 160 as described above, and transmit and receive the information of the TVBDs 140 and 160 and the information of the CMs 120 and 130. Here, while it is mainly described in the embodiment of the present invention for the sake of convenience in explanation that the CEs 150 and 170 independently exist in the TVBDs 140 and 160, it is to be noted that the CEs 150 and 170 may be included in the TVBDs 140 and 160 or the CMs 120 and 130.

In addition, the CEs 150 and 170 extract context information associated with the corresponding TVBDs 140 and 160, requested by the respective CMs 120 and 130, for example, information such as a wireless access pattern, transmission power, a spectral sensing threshold value, a position and so forth of the TVBDs 140 and 160, from the TVBDs 140 and 160, and transmit the extracted context information to the CMs 120 and 130. That is to say, the CEs 150 and 170 acquire the communication-related information of respective systems as the context information on different secondary systems, and transmit the acquired information to the CMs 120 and 130.

Further, the CEs 150 and 170 receive requests from the CMs 120 and 130 for management of the TVBDs 140 and 160, for example, requests for the context information and the configurations of the TVBDs 140 and 160, and in response to the requests, update the context information of the TVBDs 140 and 160 and reset, that is, reconfigure the configurations of the TVBDs 140 and 160. In other words, the CEs 150 and 170 receive changed information of the context information, that is, event information of the TVBDs 140 and 160, as the requests for the context information of the TVBDs 140 and 160, and update the context information of the TVBDs 140 and 160 according to the event information. Moreover, the CEs 150 and 170 receive resetting of the components of the TVBDs 140 and 160 as the requests for the configurations of the TVBDs 140 and 160, and reset, that is, reconfigure the components of the TVBDs 140 and 160 according to the resetting of the components.

The CMs 120 and 130 determine operation frequency allocation, transmission power allocation, transmission time allocation, and so forth, so as to improve the frequency sharing efficiency between the TVBDs 140 and 160. In other words, the CMs 120 and 130 perform the operation frequency allocation, the transmission power allocation, and the transmission time allocation for the TVBDs 140 and 160 in the available frequency band so as to improve the frequency sharing efficiency between the TVBDs 140 and 160 for the available frequency band in the above-described TV band.

Here, the CMs 120 and 130 perform the operation frequency allocation, the transmission power allocation, and the transmission time allocation for the corresponding TVBDs in the available frequency band by transmitting and receiving information, for example, the context information and the event information of the TVBDs, to and from the CMs, for example, neighbor CMs, of the TVBDs that do not correspond to the CMs 120 and 130, so as to more improve the frequency sharing efficiency between the TVBDs 140 and 160. In this case, the CMs 120 and 130 acquire the context information and the event information of the TVBDs that do not correspond to the CMs 120 and 130, through direct transmission and reception to and from other CMs (for example, neighbor CMs) or transmission and reception via the CDIS 110 to and from other CMs. Further, the CMs 120 and 130 acquire information on the use of a spectrum in the primary system, that is, channel information on channels available in the TV band, through an external data base, for example, TVWS DB 180, or request resetting of the components the TVBDs corresponding to the CMs 120 and 130, to other CMs.

As described above, the CDIS 110 supports the control operation of the CMs 120 and 130 for frequency sharing of the TVBDs 140 and 160 for the available frequency band in the TV band. Namely, the CDIS 110 receives and stores the context information and the event information of the TVBDs 140 and 160 from the CMs 120 and 130, and transmits the context information and the event information of the TVBDs 140 and 160 to the CMs 120 and 130 according to requests from the CMs 120 and 130. Furthermore, the CDIS 110 acquires and stores the information on the use of a spectrum in the primary system, that is, the channel information on channels available in the TV band, through the external data base, for example, the TVWS DB 180.

The TVWS DB 180 provides channel information on channels available in the TVWS, that is, shared channel information, to the CMs 120 and 130. The channel information is provided only to the TVBDs that are registered in the TVWS DB 180 and have authorized identification numbers.

The system for managing resources in a communication system in accordance with the embodiment of the present invention includes the TVWS DB 180, the CDIS 110, the CMs 120 and 130, and the CEs 140 and 160, so as to allow the secondary systems to share and use the frequency band available from the frequency band already used by the primary system, such as the TV band, that is, so as to allow coexistence and frequency sharing of the TVBDs 140 and 160. Here, the TVBDs 140 and 160 as devices of the secondary systems for sharing and using the available frequency band as described above may include a base station (hereinafter, referred to as 'BS'), an access point (hereinafter, referred to as 'AP'), a service access point (hereinafter, referred to as 'SAP'), a terminal, or the like. Also, the secondary systems as the plurality of different systems for sharing the available frequency band as described above may include different communication patterns of systems, for example, an IEEE 802.19-based system, an IEEE 802.22-based system, or the like.

Besides, the system for managing resources in a communication system in accordance with the embodiment of the present invention transmits and receives predetermined messages so as to provide the coexistence and the frequency sharing of the TVBDs 140 and 160 for the frequency band available in the already used frequency band, in particular, so as to provide the efficient coexistence and frequency sharing of the plurality of systems, for example, the TVBDs 140 and 160, in the TVWS as described above, so that frequency utilization efficiency may be improved through the effective coexistence and frequency sharing of the plurality of systems in the TVWS.

The system for managing resources operates in a management mode and an autonomous mode (or an information mode). In the management mode, the system for managing resources reflects the frequency sharing devices indicated by the CMs, that is, the setting of the TVBDs and the resetting of the configurations of the TVBDs, on the TVBDs. In the autonomous mode, the system for managing resources makes by itself a decision on the coexistence and frequency sharing, on the basis of the information regarding the coexistence and frequency sharing, which is received by the CEs from the CMs. The decision made on the coexistence and frequency sharing is reflected on the TVBDs on which the setting of the TVBDs and the resetting of the configurations of the TVBDs are reflected. Also, the system for managing resources operates in a centralized topology and a distributed topology. In the centralized topology, among a plurality of CMs, a plurality of slave CMs are connected to one optional master CM. The slave CMs are controlled by the master CM for coexistence and frequency sharing among TVBDs. In the distributed topology, coexistence and frequency sharing among the TVBDs are implemented through negotiation between one optional CM and neighbor CMs of the one CM among a plurality of CMs.

The system for managing resources in a communication system in accordance with the embodiment of the present invention operates in the centralized topology or the distributed topology for the coexistence and frequency sharing of the TVBDs 140 and 160 for the frequency band available from the already used frequency band. At this time, the system for managing resources performs negotiation with a neighbor frequency sharing device, that is, a predetermined TVBD, for example, the TVBD1 140, the CE1 and the CM1 and another neighbor frequency sharing device, for example, the TVBD2 160, the CE2 170 and the CM2 130. Here, in the system for managing resources, in order for coexistence and frequency sharing of the TVBDs 140 and 160, the CM1 120 negotiates with the neighbor CM2 130. At this time, the TVBD2 160 registered in the CM2 130 is a TVBD which interferes with the TVBD1 140 registered in the CM1 120 (hereinafter, referred to as a 'host CM') which is to perform negotiation. Through the negotiation between the CM1 120 as the host CM and the CM2 130 as the neighbor CM, the coexistence and frequency sharing between the TVBDs 140 and 160 are implemented.

Further, in the system for managing resources in a communication system in accordance with the exemplary embodiment of the present invention, in order for the negotiation between the CM1 as the host CM and the CM2 130 as the neighbor CM to be efficiently performed, in the case where available frequency bands are more than frequency bands to be used by frequency sharing devices, for example, the TVBDs 140 and 160, the negotiation between the CM1 as the host CM and the CM2 as the neighbor CM is performed on the basis of an etiquette mode in which the TVBDs 140 and 160 use independent frequencies of each other. Further, in the system for managing resources, in the case where available frequency bands are less than frequency bands to be used by the TVBDs 140 and 160, the negotiation between the CM1 as the host CM and the CM2 as the neighbor CM is performed on the basis of a contention mode in which a time division multiplexing (hereinafter, referred to as 'TDM') scheme between the TVBDs 140 and 160 is used. Here, the contention mode using the TDM scheme includes a round-robin mode in which all CMs are allocated with resources, for example, time slots, in proportion to the number of neighbor TVBDs, and a competition mode in which all CMs are sequentially allocated with respective time slots according to a contention number by using the contention number. Hereafter, a negotiating operation of the system for managing resources in a communication system in accordance with the exemplary embodiment of the present invention will be described with reference to FIG. 2.

Figure 2:
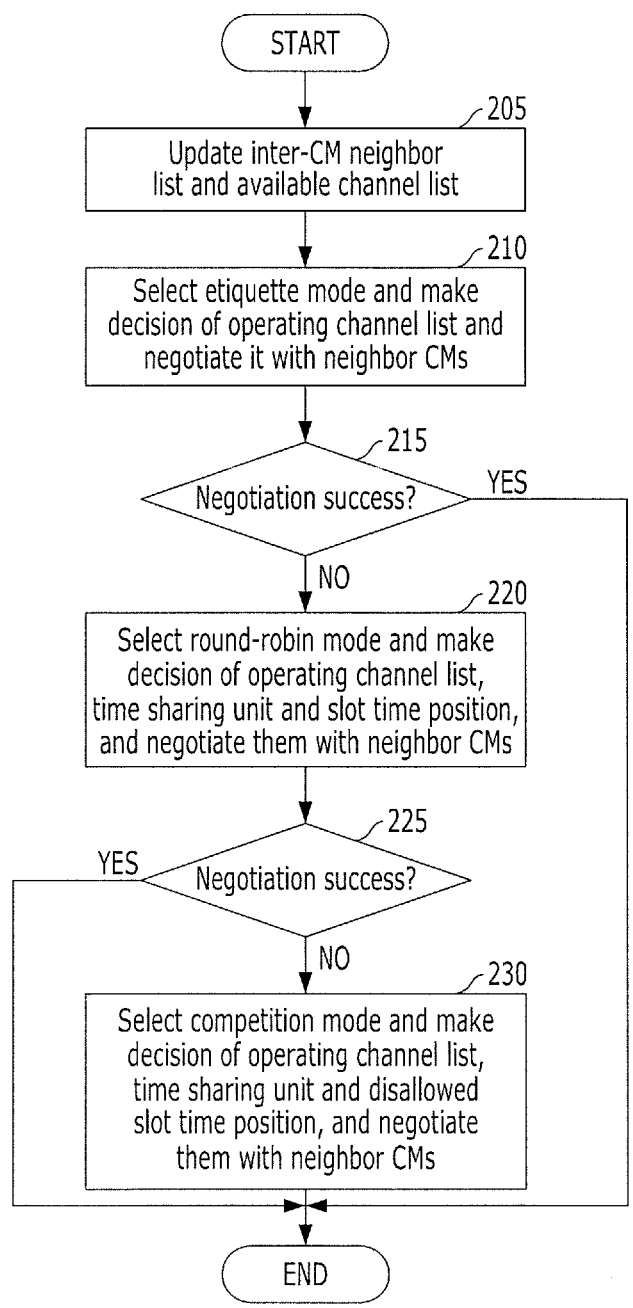
FIG. 2 is a flow chart schematically explaining a negotiating operation of the system for managing resources in a communication system in accordance with the exemplary embodiment of the present invention.

FIG. 2 is a flow chart schematically explaining a negotiating operation of the system for managing resources in a communication system in accordance with the exemplary embodiment of the present invention. FIG. 2 is a flow chart schematically explaining a procedure in which the system for managing resources in a communication system in accordance with the exemplary embodiment of the present invention performs a negotiating operation on the basis of the etiquette mode, the round-robin mode and the competition mode.

Referring to FIG. 2, in order for the coexistence and frequency sharing in the TVWS, in step 205, the host CM of the system for managing resources updates the list of neighbor frequency sharing systems, that is, the TVBDs registered in CMs neighboring to the host CM itself, for example, inter-CM neighbor TVBDs, and the list of available channels in the TVWS.

Then, in step 210, the etiquette mode is selected among the etiquette mode, the round-robin mode and the competition mode, an operating channel list in the etiquette mode is determined, and negotiation with the neighbor CMs is performed on the basis of the determined operating channel list of the etiquette mode.

In succession, in step 215, it is checked whether the negotiation in the etiquette mode has succeeded. In the case where the negotiation in the etiquette mode has failed as a result of the checking in the step 215, in step 220, the round-robin mode is selected between the round-robin mode and the competition mode, and an operating channel list, a time sharing unit and time slot positions are determined. On the basis of the determined operating channel list, time sharing unit and time slot positions in the round-robin mode, negotiation with the neighbor CMs is performed.

Next, in step 225, whether the negotiation in the round-robin mode has succeeded is checked. In the case where the negotiation in the round-robin mode has failed as a result of the checking in the step 225, in step 230, the competition mode is selected, and an operating channel list, a time sharing unit and unused time slot positions are determined. On the basis of the determined operating channel list, time sharing unit and unused time slot positions in the competition mode, negotiation with the neighbor CMs is performed. Hereafter, negotiation procedures in the etiquette mode, the round-robin mode and the competition mode in the system for managing resources in a communication system in accordance with the exemplary embodiment of the present invention will be described in detail with reference to FIGS. 3 to 6.

Figure 3:
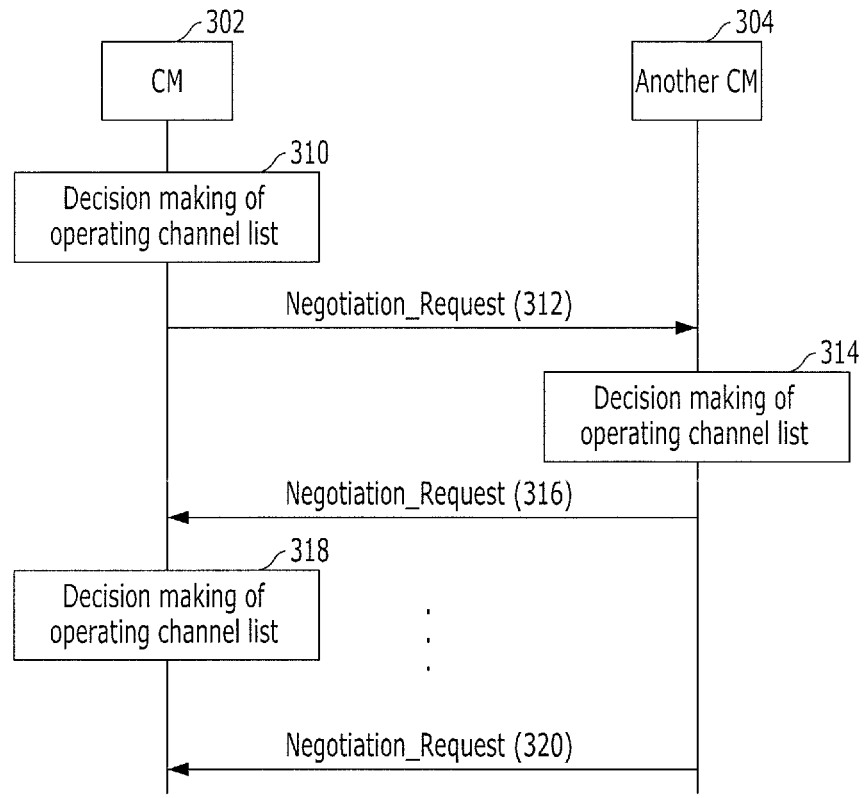
FIGS. 3, 5 and 6 are diagrams schematically showing a negotiation procedure of the system for managing resources in a communication system in accordance with the exemplary embodiment of the present invention.

FIG. 3 is a diagram schematically showing a negotiation procedure of the system for managing resources in a communication system in accordance with the exemplary embodiment of the present invention. FIG. 3 is a diagram schematically showing a negotiation procedure on the basis of the etiquette mode of the system for managing resources in a communication system in accordance with the exemplary embodiment of the present invention. Further, FIG. 3 is a diagram schematically showing message transmission and reception flow for negotiation in the etiquette mode in which independent frequencies are used among TVBDs in the case where idle frequency bands, that is, TVWSs are more than frequency sharing systems, that is, TVBDs.

Referring to FIG. 3, in order to allow a host CM and a neighbor CM to perform negotiation on the basis of the etiquette mode for coexistence and frequency sharing in the TVWS, a host CM 302 updates channel classification and registration information of the TVBDs registered in the host CM 302 and a neighbor CM 304 in the etiquette mode, that is, updates an available channel list and a list of TVBDs and determines an operating channel list (step 310).

Then, the host CM 302 transmits a negotiation request (hereinafter, referred to as 'Negotiation_Request') message for negotiation with all CMs neighboring to the host CM 302 itself in the etiquette mode, to the neighbor CM 204 (step 312).

Also, the neighbor CM 304 updates channel classification and registration information of the TVBDs registered in the host CM 302 and the neighbor CM 304 in the etiquette mode, that is, updates an available channel list and a list of TVBDs, by using the Negotiation_Request messaged received from the host CM 302, and determines an operating channel list (step 314).

Afterwards, the neighbor CM 304 transmits a Negotiation_Request message to the host CM 302, as a response to the Negotiation_Request message received from the host CM 302 (step 316).

Here, the Negotiation_Request messages as messages which are used for the negotiation between the host CM 302 and the neighbor CM 304 are messages, which request and provide information on negotiation between the CMs in the etiquette mode, for example, information on channel lists according to channel classification, such as an operating channel list, an available channel list and a supportable channel list, for coexistence and frequency sharing between the TVBDs. That is to say, the Negotiation_Request message is a message which provides the negotiation-related information of the host CM 302 and requests the negotiation-related message of the neighbor CM 304 in the case where the Negotiation_Request message is transmitted by the host CM 302, and is a message which provides the negotiation-related information of the neighbor CM 304 and requests the negotiation-related message of the host CM 302 in the case where the Negotiation_Request message is transmitted by the neighbor CM 304. Further, the Negotiation_Request message includes contents, that is, the header, the payload and the data type of the Negotiation_Request message.

The payload of the Negotiation_Request message includes negotiation statuses, and the negotiation statuses are defined as negotiation success, negotiation failure and under-negotiation.

Furthermore, the payload of the Negotiation_Request message includes negotiation information. The negotiation information includes mode information indicating time scheduling, operating channel list information, time sharing unit information, slot time position information, number of slots information, disallowed slot time position information, list of contention number information, etc. Here, the time sharing unit information is defined as a reference time, a window time and a slot time. The reference time is used for synchronization with other frequency sharing systems, that is, other TVBDs, the window time is a repeated transmission cycle, and the slot time is a basic unit of the window time. Here, the time sharing unit information, in particular, the time sharing unit information in the round-robin mode and the competition mode of the contention mode which adopts the TDM scheme as will be described later is as shown in FIG. 4.

Figure 4:
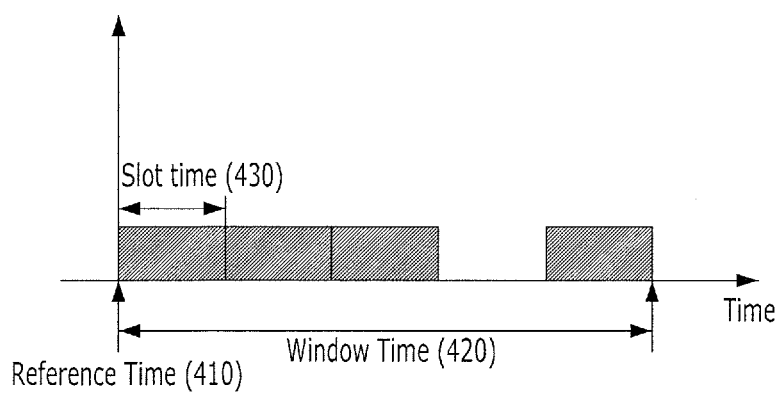
FIG. 4 is a graph explaining time sharing unit information in a contention mode of the system for managing resources in a communication system in accordance with the exemplary embodiment of the present invention.

Namely, referring to FIG. 4, the time sharing unit information is defined as a reference time 410, a window time 420 and a slot time 430. As described above, the reference time is used for synchronization with other frequency sharing systems, that is, other TVBDs, the window time is a repeated transmission cycle, and the slot time is a basic unit of the window time. Here, FIG. 4 is a diagram explaining the time sharing unit information in the contention mode of the system for managing resources in a communication system in accordance with the exemplary embodiment of the present invention.

Moreover, the host CM 302 updates the channel classification and registration information of the TVBDs registered in the host CM 302 and the neighbor CM 304 in the etiquette mode, by using the Negotiation_Request message received from the neighbor CM 304, and determines an operating channel list (step 318).

In this way, the host CM 302 and the neighbor CM 304 repeatedly transmit and receive the Negotiation_Request messages including the negotiation-related information, as described above, and update the channel classification and registration information of the TVBDs registered in the host CM 302 and the neighbor CM 304, through the negotiation-related information, in particular, the channel list information, included in the Negotiation_Request message repeatedly transmitted and received, that is, update the available channel lists and the lists of TVBDs, an determine operating channel lists. At this time, the host CM 302 and the neighbor CM 304 check and determine the available channels. Here, in the case where the number of transmission and reception times of the Negotiation_Request message exceeds a predetermined number of times or no available channel exists, it is determined that the negotiation between the host CM 302 and the neighbor CM 304 in the etiquette mode has failed, and as described above, negotiation is performed in the round-robin mode.

In the case where an available channel exists in the etiquette mode and the negotiation between the host CM 302 and the neighbor CM 304 has succeeded, the host CM 302 receives a predetermined Negotiation_Request message in which the negotiation status is included as negotiation success, from the neighbor CM 304, and completes the negotiation in the etiquette mode (step 320).

In other words, as described above, the host CM 302 updates the channel classification and registration information of the TVBDs registered in the host CM 302 and the neighbor CM 304, and transmits and receives the Negotiation_Request message. At this time, in the case where the number of transmission and reception times of the Negotiation_Request message exceeds the predetermined number of times, the host CM 302 determines that the negotiation in the etiquette mode has failed. Also, in the case where the neighbor CM 304 requests change of the operating channel list through the Negotiation_Request message and no change in the registration information exists, the host CM 302 selects the operating channel list requested by the neighbor CM 304. At this time, if the operating channel list requested by the neighbor CM 304 is not selected, an operating channel list is selected by checking available channels from the channel classification.

In addition, the host CM 302 checks a supportable channel list of the registered TVBDs, and selects an operating channel list by checking available channels from the supportable channel list. Besides, after the host CM 302 checks the network types of the registered TVBDs, the host CM 302 selects an operating channel list by checking available channels which satisfy the corresponding network types. Also, after the host CM 302 checks desired bandwidths of the registered TVBDs, the host CM 302 selects an operating channel list by checking available channels which satisfy the desired bandwidths.

The host CM 302 performs the negotiation in the etiquette mode by repeatedly transmitting and receiving the Negotiation_Request messages which include information on the operating channel list selected in this way, as the negotiation-related information, to and from the neighbor CM 304. At this time, in the case where no available channel exists, the host CM 302 determines that the negotiation in the etiquette mode has failed, and performs negotiation in the round-robin mode as described above. Hereafter, a negotiation procedure in the round-robin mode of the system for managing resources in a communication system in accordance with the exemplary embodiment of the present invention will be described in detail with reference to FIG. 5.

Figure 5:
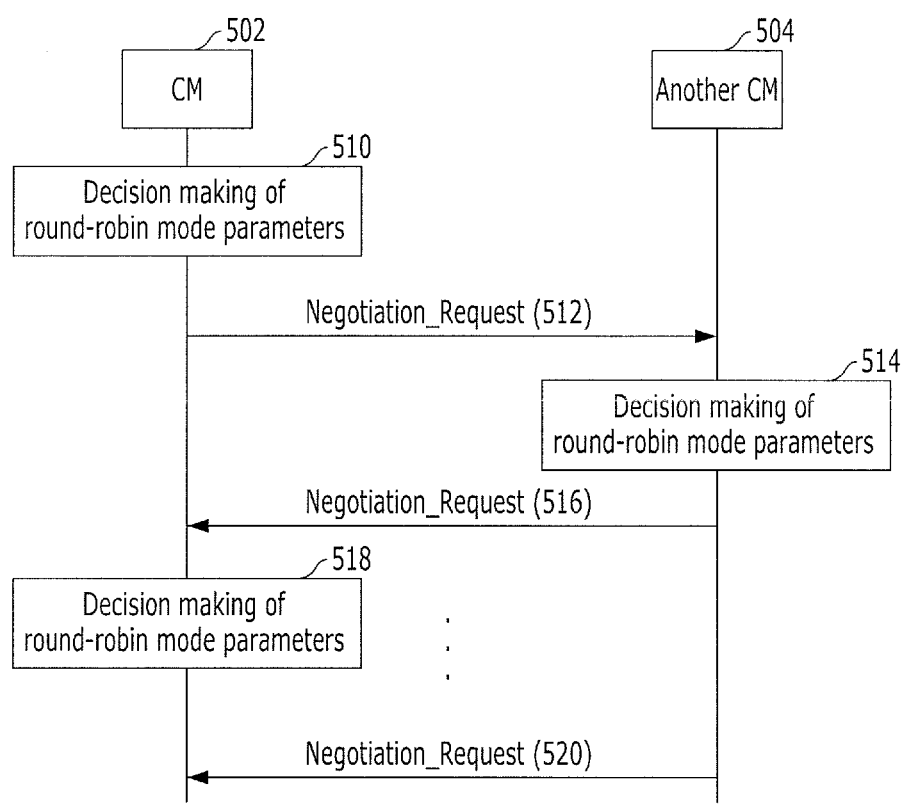

FIG. 5 is a diagram schematically showing a negotiation procedure of the system for managing resources in a communication system in accordance with the exemplary embodiment of the present invention. FIG. 5 is a diagram schematically showing a negotiation procedure on the basis of the round-robin mode of the system for managing resources in a communication system in accordance with the exemplary embodiment of the present invention. Further, FIG. 5 is a diagram schematically showing message transmission and reception flow for negotiation in the round-robin mode in which idle frequency bands, that is, TVWSs, are less than frequency sharing systems, that is, TVBDs, and thus, the TVBDs use the same frequencies and all CMs are allocated with resources, for example, time slots, in proportion to the number of neighbor TVBDs.

Referring to FIG. 5, in order to allow a host CM and a neighbor CM to perform negotiation on the basis of the round-robin mode for coexistence and frequency sharing in the TVWS, a host CM 502 updates channel classification and registration information of the TVBDs registered in the host CM 502 and a neighbor CM 504, that is, updates an available channel list and a list of TVBDs, and determines parameters of the round-robin mode for the registered TVBDs, for example, an operating channel list, a time sharing unit and time slot positions of the round-robin mode (step 510).

Then, the host CM 502 transmits a negotiation request message for negotiation with all CMs neighboring to the host CM 502 itself in the round-robin mode, to the neighbor CM 504 (step 512).

Also, the neighbor CM 504 updates channel classification and registration information of the TVBDs registered in the host CM 502 and the neighbor CM 504, that is, updates an available channel list and a list of TVBDs, by using the Negotiation_Request message received from the host CM 502, and determines the parameters of the round-robin mode for the registered TVBDs, for example, the operating channel list, the time sharing unit and the time slot positions of the round-robin mode (step 514).

Afterwards, the neighbor CM 504 transmits a Negotiation_Request message to the host CM 502, as a response to the Negotiation_Request message received from the host CM 502 (step 516).

Here, the Negotiation_Request messages as messages which are used for the negotiation between the host CM 502 and the neighbor CM 504 are messages and which request and provide information on negotiation between the CMs in the round-robin mode and the parameters of the round-robin mode such as the operating channel list, the time sharing unit and the time slot positions of the round-robin mode, for coexistence and frequency sharing between the TVBDs. That is to say, the Negotiation_Request message is a message which provides the negotiation-related information of the host CM 502 and requests the negotiation-related message of the neighbor CM 504 in the case where the Negotiation_Request message is transmitted by the host CM 502, and is a message which provides the negotiation-related information of the neighbor CM 504 and requests the negotiation-related message of the host CM 502 in the case where the Negotiation_Request message is transmitted by the neighbor CM 504. Further, the Negotiation_Request message includes contents, that is, the header, the payload and the data type of the Negotiation_Request message.

Further, the host CM 502 updates and determines the parameters of the round-robin mode for the host CM 502 in the round-robin mode, for example, the operating channel list, the time sharing unit and the time slot positions of the round-robin mode, by using the Negotiation_Request message received from the neighbor CM 504 (step 518).

In this way, the host CM 502 and the neighbor CM 504 repeatedly transmit and receive the Negotiation_Request messages including the negotiation-related information, as described above, update the negotiation-related information, in particular, the operating channel list, the time sharing unit and the time slot positions of the round-robin mode, included in the Negotiation_Request message repeatedly transmitted and received, and determines the parameters of the round-robin mode by checking available channels. Here, in the case where the number of transmission and reception times of the Negotiation_Request message exceeds a predetermined number of times or no available channel exists, it is determined that the negotiation between the host CM 502 and the neighbor CM 504 in the round-robin mode has failed, and as described above, negotiation is performed in the competition mode.

In the case where an available channel exists in the round-robin mode and the negotiation between the host CM 502 and the neighbor CM 504 has succeeded, the host CM 502 receives a predetermined Negotiation_Request message in which the negotiation status is included as negotiation success, from the neighbor CM 504, and completes the negotiation in the round-robin mode (step 520).

In other words, as described above, the host CM 502 updates the channel classification and registration information of the TVBDs registered in the host CM 502 and the neighbor CM 504, determines the parameters of the round-robin mode, such as the operating channel list, the time sharing unit and the time slot positions of the round-robin mode, and transmits and receives the Negotiation_Request message. At this time, in the case where the number of transmission and reception times of the Negotiation_Request message exceeds the predetermined number of times, the host CM 502 determines that the negotiation in the round-robin mode has failed.

Also, in the case where the neighbor CM 504 requests change of the parameters of the round-robin mode, for example, change of the operating channel list, through the Negotiation_Request message, the host CM 502 selects an operating channel list using the coexistence information of the TVBDs and available channel lists. Here, the host CM 502 selects a requested operating channel list by accommodating the change of the operating channel list requested by the neighbor CM 504, or selects another operating channel list using the coexistence information of the TVBDs and the available channel lists without accommodating the change of the operating channel list requested by the neighbor CM 504.

Further, in the case where change of the time sharing unit is requested as the request of the change of the parameters of the round-robin mode, the host CM 502 selects a time sharing unit using the coexistence information of the TVBDs. Here, the host CM 502 selects a requested time sharing unit by accommodating the change of the time sharing unit requested by the neighbor CM 504, or selects another time sharing unit using the coexistence information of the TVBDs without accommodating the change of the time sharing unit requested by the neighbor CM 504. At this time, the host CM 502 selects a reference time for synchronization with other TVBDs, selects a window time that satisfies QoS performances (such as a latency, a duty cycle, and so forth), on the basis of the coexistence information of the TVBDs, and selects time slot positions that satisfy the duty cycle, on the basis of the coexistence information of the TVBDs.

After the host CM 502 selects the number of required time slots using the time sharing unit, the list of neighbor TVBDs and the coexistence information of the registered TVBDs, the host CM 502 selects the positions of the time slots using the time sharing unit, the number of required time slots and the coexistence information of the registered TVBDs.

The host CM 502 performs the negotiation in the round-robin mode by repeatedly transmitting and receiving the Negotiation_Request message including the parameters of the round-robin mode selected in this way, for example, the operating channel list, the time sharing unit and the time slot positions of the round-robin mode, as the negotiation-related information, to and from the neighbor CM 504. At this time, in the case where no available channel exists by not selecting the parameters of the round-robin mode, for example, the operating channel list, the time sharing unit and the time slot positions of the round-robin mode, and the registered TVBDs do not support time scheduling, the negotiation failure in the round-robin mode is determined, and negotiation is performed in the competition mode as described above. Hereafter, a negotiation procedure in the round-robin mode of the system for managing resources in a communication system in accordance with the exemplary embodiment of the present invention will be described in detail with reference to FIG. 6.

Figure 6:
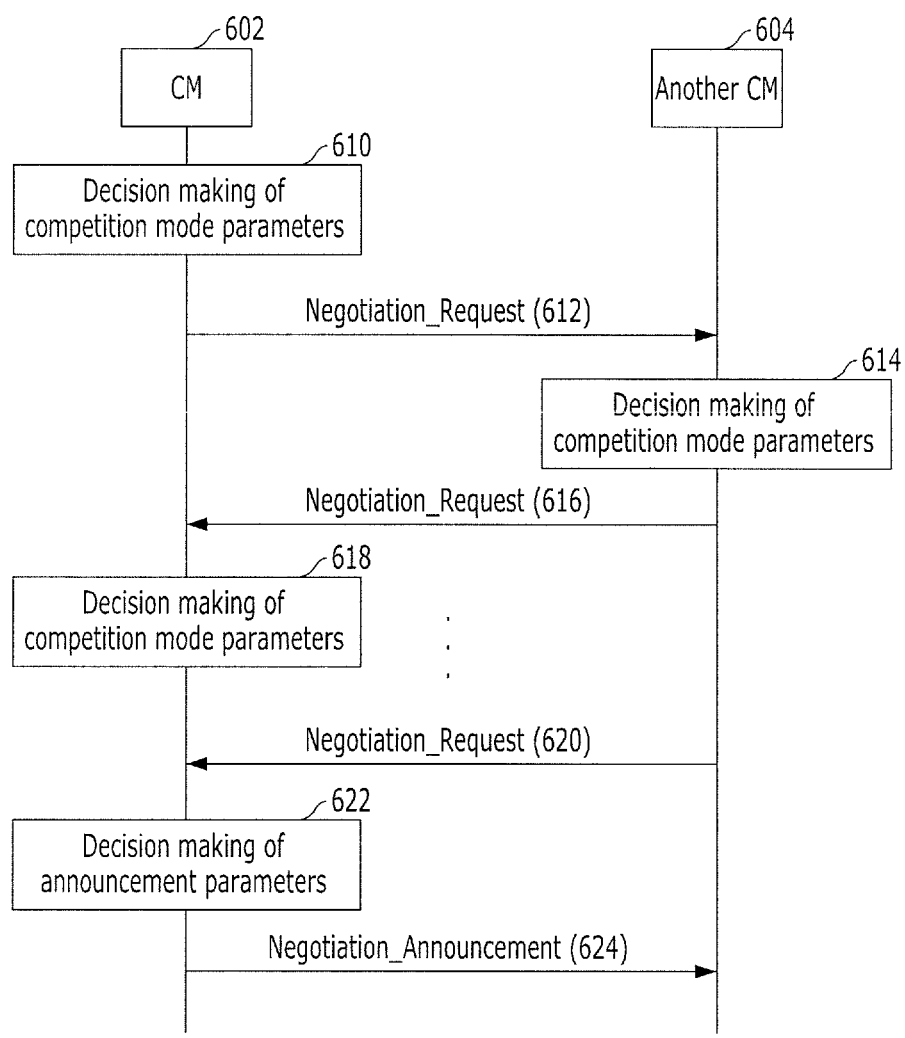

FIG. 6 is a diagram schematically showing a negotiation procedure of the system for managing resources in a communication system in accordance with the exemplary embodiment of the present invention. FIG. 6 is a diagram schematically showing a negotiation procedure on the basis of the competition mode of the system for managing resources in a communication system in accordance with the exemplary embodiment of the present invention. Further, FIG. 6 is a diagram schematically showing message transmission and reception flow for negotiation in the competition mode in which idle frequency bands, that is, TVWSs, are less than frequency sharing systems, that is, TVBDs, and thus, the TVBDs use the same frequencies and all CMs are sequentially allocated with respective time slots according to a contention number by using the contention number.

Referring to FIG. 6, in order to allow a host CM and a neighbor CM to perform negotiation on the basis of the competition mode for coexistence and frequency sharing in the TVWS, a host CM 602 updates channel classification and registration information of the TVBDs registered in the host CM 602 and a neighbor CM 604, that is, updates an available channel list and a list of TVBDs, and determines parameters of the competition mode for the registered TVBDs, for example, an operating channel list, a time sharing unit and unused time slot positions of the competition mode (step 610).

Then, the host CM 602 transmits a negotiation request message for negotiation with all CMs neighboring to the host CM 602 itself in the competition mode, to the neighbor CM 604 (step 612).

Also, the neighbor CM 604 updates channel classification and registration information of the TVBDs registered in the host CM 602 and the neighbor CM 604, that is, updates an available channel list and a list of TVBDs, by using the Negotiation_Request message received from the host CM 602, and determines the parameters of the competition mode for the registered TVBDs, for example, the operating channel list, the time sharing unit and the unused time slot positions of the competition mode (step 614).

Afterwards, the neighbor CM 604 transmits a Negotiation_Request message to the host CM 602, as a response to the Negotiation_Request message received from the host CM 602 (step 616).

Here, the Negotiation_Request messages as messages which are used for the negotiation between the host CM 602 and the neighbor CM 604 are messages and which request and provide information on negotiation between the CMs in the competition mode and the parameters of the competition mode such as the operating channel list, the time sharing unit and the unused time slot positions of the competition mode, for coexistence and frequency sharing between the TVBDs. That is to say, the Negotiation_Request message is a message which provides the negotiation-related information of the host CM 602 and requests the negotiation-related message of the neighbor CM 604 in the case where the Negotiation_Request message is transmitted by the host CM 602, and is a message which provides the negotiation-related information of the neighbor CM 604 and requests the negotiation-related message of the host CM 602 in the case where the Negotiation_Request message is transmitted by the neighbor CM 604. Further, the Negotiation_Request message includes contents, that is, the header, the payload and the data type of the Negotiation_Request message.

Further, the host CM 602 updates and determines the operating channel list, the time sharing unit and the unused time slot positions of the competition mode for the host CM 602 in the competition mode, by using the Negotiation_Request message received from the neighbor CM 604 (step 618).

In this way, the host CM 602 and the neighbor CM 604 repeatedly transmit and receive the Negotiation_Request messages including the negotiation-related information, as described above, update the negotiation-related information, in particular, the operating channel list, the time sharing unit and the unused time slot positions of the competition mode, included in the Negotiation_Request message repeatedly transmitted and received, and determines the parameters of the competition mode by checking available channels. Here, in the case where the number of transmission and reception times of the Negotiation_Request message exceeds a predetermined number of times or no available channel exists, it is determined that the negotiation between the host CM 602 and the neighbor CM 604 in the competition mode has failed, and a new TVWS is searched.

In the case where an available channel exists in the competition mode and the negotiation between the host CM 602 and the neighbor CM 604 has succeeded, the host CM 602 receives a predetermined Negotiation_Request message in which the negotiation status is included as negotiation success, from the neighbor CM 604 (step 620).

Then, the host CM 602 confirms the parameters of the competition mode according to the negotiation success, for example, the operating channel list, the time sharing unit and the unused time slot positions of the competition mode, by using the Negotiation_Request message, and determines announcement parameters according to the negotiation success, for example, the list, the time sharing unit and the time slot positions of CMs having succeeded negotiation (step 622).

Moreover, the host CM 602 announces the negotiation success result to all neighbor CMs. Namely, in order to announce the negotiation result to the neighbor CMs, the host CM 602 transmits a negotiation announcement (hereinafter, referred to as 'Negotiation_Announcement' message which includes the announcement parameters according to the negotiation success, for example, the list, the time sharing unit and the time slot positions of CMs having succeeded negotiation, to the neighbor CM 604 (step 624).

Here, the Negotiation_Announcement message, as a message for the host CM 602 to announce a negotiation result to all CMs neighboring to the host CM 602 itself after completion of the negotiation, is a message which provides information on a negotiation result between the host CM 602 and neighbor CMs to the neighbor CMs. Further, the Negotiation_Announcement message includes contents, that is, the header, the payload and the data type of the Negotiation_Announcement message.

In other words, as described above, the host CM 602 updates the channel classification and registration information of the TVBDs registered in the host CM 602 and the neighbor CM 604, determines the parameters of the competition mode, such as the operating channel list, the time sharing unit and the unused time slot positions of the competition mode, and transmits and receives the Negotiation_Request message. At this time, in the case where the number of transmission and reception times of the Negotiation_Request message exceeds the predetermined number of times, the host CM 602 determines that the negotiation in the competition mode has failed.

Also, in the case where the neighbor CM 604 requests change of the parameters of the competition mode, for example, change of the operating channel list, through the Negotiation_Request message, the host CM 602 selects an operating channel list using the coexistence information of the TVBDs and available channel lists. Here, the host CM 602 selects a requested operating channel list by accommodating the change of the operating channel list requested by the neighbor CM 604, or selects another operating channel list using the coexistence information of the TVBDs and the available channel lists without accommodating the change of the operating channel list requested by the neighbor CM 604.

Further, in the case where change of the time sharing unit is requested as the request of the change of the parameters of the competition mode, the host CM 602 selects a time sharing unit using the coexistence information of the TVBDs. Here, the host CM 602 selects a requested time sharing unit by accommodating the change of the time sharing unit requested by the neighbor CM 604, or selects another time sharing unit using the coexistence information of the TVBDs without accommodating the change of the time sharing unit requested by the neighbor CM 604. At this time, the host CM 602 selects a reference time for synchronization with other TVBDs, selects a window time that satisfies QoS performances (such as a latency, a duty cycle, and so forth), on the basis of the coexistence information of the TVBDs, and selects time slot positions that satisfy the duty cycle, on the basis of the coexistence information of the TVBDs.

The host CM 602 checks the unused time slot positions using the time sharing unit, the list of neighbor TVBDs and the coexistence information of the registered TVBDs. Also, the host CM 602 generates a contention number list using a random number generator.

That is to say, after the host CM 602 checks the positions of the time slots not used in all neighbor TVBDs and the contention number, the host CM 602 checks the time sharing unit determined through negotiation with the neighbor CM 604, selects a list of CMs having succeeded the negotiation where the list of CMs having succeeded the negotiation is sequentially selected according to contention numbers, for example, according to the sequence of CMs with greater contention numbers, and selects a time slot position list using the list of CMs having succeeded the negotiation and the time sharing unit. Therefore, the host CM 602 completes the negotiation in the competition mode, and announces a negotiation result to the neighbor CMs, that is, transmits the Negotiation_Announcement message including the announcement parameters according to the negotiation success, for example, the list of CMs having succeeded the negotiation, the time sharing unit and the time slot position list, to the neighbor CM 604.

As described above, in the system for managing resources in a communication system in accordance with the exemplary embodiment of the present invention, in order to allow an optional CM and other CMs to perform negotiation on the basis of the etiquette mode, the round-robin mode and the competition mode for coexistence and frequency sharing in the TVWS, the Negotiation_Request message is transmitted and received until the negotiation between the optional CM and the neighbor CMs is completed, the Negotiation_Announcement is transmitted and received when the negotiation is completed, so that the coexistence and frequency sharing among the plurality of systems, that is, the TVBDs, in the TVWS are supported.

As is apparent from the above descriptions, in accordance with the embodiments of the present invention, frequency resources are managed such that a plurality of systems can use available frequency bands among frequency bands used in advance like a TV band through coexistence and frequency sharing in a communication system, thereby allowing efficient use of limited frequency resources and improving frequency resource utilization efficiency.

While the present invention has been described with respect to the specific embodiments, it will be apparent to those skilled in the art that various changes and modifications may be made without departing from the spirit and scope of the invention as defined in the following claims.

What is claimed is:

1. A system for managing resources in a communication system including a plurality of systems which do not have a permission for a first frequency band, the system comprising:
   a coexistence manager configured to, when a frequency band available for the plurality of systems is searched from the first frequency band, manage the plurality of systems for coexistence and frequency sharing of the plurality of systems in the available frequency band;
   a coexistence enabler configured to transmit and receive information of the plurality of systems and information of the coexistence manager; and
   a coexistence discovery and information server configured to support control of the coexistence manager over the plurality of systems,
   wherein a plurality of coexistence managers are provided to respectively correspond to the plurality of systems, and
   wherein, among the plurality of coexistence managers, a first coexistence manager selects a mode from among an etiquette mode, a round-robin mode and a competition mode as a negotiation procedure based on the available frequency band, and performs a negotiation procedure with coexistence managers neighboring to it, on the basis of the mode selected by the coexistence managers from among an etiquette mode, a round-robin mode and a competition mode.

2. The system of claim 1, wherein, in the case where the available frequency band is larger than a frequency band which is to be used by the plurality of systems, the first coexistence manager selects the etiquette mode, updates channel classification information in the etiquette mode and information of the plurality of systems, determines an operating channel list in the etiquette mode, and then performs the negotiation procedure with the neighbor coexistence managers.

3. The system of claim 2, wherein the first coexistence manager determines the operating channel list by checking an available channel list, a supportable channel list, a network type and requested bands of the plurality of systems from the channel classification information.

4. The system of claim 3, wherein the first coexistence manager transmits a first negotiation request message including negotiation-related information according to the operating channel list, to the neighbor coexistence managers, and receives, as a response to the first negotiation request message, a second negotiation request message including negotiation-related information according to operating channel lists determined in the neighbor coexistence managers, from the neighbor coexistence managers.

5. The system of claim 4, wherein the first coexistence manager and the neighbor coexistence managers update the channel classification information in the etiquette mode and the information of the plurality of systems by respectively using the second negotiation request message and the first negotiation request message.

6. The system of claim 1, wherein, in the case where the available frequency band is smaller than a frequency band which is to be used by the plurality of systems, the first coexistence manager selects the round-robin mode, updates channel classification information in the round-robin mode and information of the plurality of systems, determines an operating channel list, a time sharing unit and time slot positions in the round-robin mode, and then performs the negotiation procedure with the neighbor coexistence managers.

7. The system of claim 6, wherein the first coexistence manager checks an available channel list from the channel classification information, and determines the operating channel list by using the available channel list and the information of the plurality of systems.

8. The system of claim 7, wherein the first coexistence manager determines the time sharing unit by using the information of the plurality of systems, checks a list of the plurality of systems from the information of the plurality of systems, and determines the number of required time slots by using the time sharing unit and the list and the information of the plurality of systems.

9. The system of claim 8, wherein the first coexistence manager determines the time slot positions by determining positions of required time slots through the time sharing unit, the number of required time slots and the information of the plurality of systems.

10. The system of claim 9, wherein the first coexistence manager transmits a first negotiation request message including negotiation-related information according to the operating channel list, the time sharing unit and the time slot positions, to the neighbor coexistence managers, and receives, as a response to the first negotiation request message, a second negotiation request message including negotiation-related information according to operating channel lists, time sharing units and time slot positions determined in the neighbor coexistence managers, from the neighbor coexistence managers.

11. The system of claim 10, wherein the first coexistence manager and the neighbor coexistence managers update the channel classification information in the round-robin mode and the information of the plurality of systems by respectively using the second negotiation request message and the first negotiation request message.

12. The system of claim 6, wherein, in the round-robin mode, the plurality of systems use the same frequency, and the plurality of coexistence managers are allocated with time slots in proportion to the numbers of pluralities of systems neighboring to them.

13. The system of claim 1, wherein, in the case where the available frequency band is smaller than a frequency band which is to be used by the plurality of systems, the first coexistence manager selects the competition mode, updates channel classification information in the competition mode and information of the plurality of systems, determines an operating channel list, a time sharing unit and unused time slot positions in the competition mode, and then performs the negotiation procedure with the neighbor coexistence managers.

14. The system of claim 13, wherein the first coexistence manager checks an available channel list from the channel classification information, and determines the operating channel list by using the available channel list and the information of the plurality of systems.

15. The system of claim 14, wherein the first coexistence manager determines the time sharing unit by using the information of the plurality of systems, checks a list of the plurality of systems from the information of the plurality of systems, checks the unused time slot positions and a contention number by using the time sharing unit and the list and the information of the plurality of systems, and determines a list of coexistence managers having succeeded in the negotiation procedure and positions of slot times.

16. The system of claim 15, wherein the first coexistence manager transmits a first negotiation request message including negotiation-related information according to the operating channel list, the time sharing unit and the unused time slot positions, to the neighbor coexistence managers, and receives, as a response to the first negotiation request message, a second negotiation request message including negotiation-related information according to operating channel lists, time sharing units and unused time slot positions determined in the neighbor coexistence managers, from the neighbor coexistence managers.

17. The system of claim 16, wherein the first coexistence manager and the neighbor coexistence managers update the channel classification information in the competition mode and the information of the plurality of systems by respectively using the second negotiation request message and the first negotiation request message.

18. The system of claim 15, wherein the first coexistence manager transmits a negotiation announcement message including negotiation result information according to the list of the coexistence managers having succeeded in the negotiation procedure and the positions of the slot times, to the neighbor coexistence managers.

19. The system of claim 13, wherein, in the competition mode, the plurality of systems use the same frequency, and the plurality of coexistence managers are sequentially allocated with time slots according to the contention number.

20. A method for managing resources of a first frequency band in a communication system including a plurality of systems which do not have a permission for the first frequency band, the method comprising:
  transmitting a first negotiation request message by a first coexistence manager to coexistence managers neighboring to the first coexistence managers among a plurality of coexistence managers for managing the plurality of systems, when a frequency band available for the plurality of systems is searched from the first frequency band, for coexistence and frequency sharing of the plurality of systems in the available frequency band;
  receiving by the first coexistence manager, as a response to the first negotiation request message, a second negotiation request message from the neighbor coexistence managers; and
  through repeatedly transmitting and receiving the first and second negotiation request messages, performing by the first coexistence manager a negotiation procedure with the neighbor coexistence managers on the basis of a mode selected from among an etiquette mode, a round-robin mode and a competition mode as a negotiation procedure based on the available frequency.

* * * * *